United States Patent
Patel et al.

(10) Patent No.: US 8,258,736 B2
(45) Date of Patent: Sep. 4, 2012

(54) FAIL-SAFE CONTROLS FOR ELECTRIC TRACTION DRIVE SYSTEMS

(75) Inventors: Nitinkumar R. Patel, Cypress, CA (US); Tim M. Grewe, Northville, MI (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 12/582,562

(22) Filed: Oct. 20, 2009

(65) Prior Publication Data

US 2011/0089876 A1    Apr. 21, 2011

(51) Int. Cl.
*H02P 1/04* (2006.01)
(52) U.S. Cl. ......... 318/400.33; 318/400.01; 318/400.32; 318/400.36; 318/700
(58) Field of Classification Search ............. 318/400.01, 318/400.32, 400.33, 400.36, 700
See application file for complete search history.

(56) References Cited

U.S. PATENT DOCUMENTS

| 4,492,999 A * | 1/1985 | Amagasa ......................... 361/21 |
| 5,568,371 A * | 10/1996 | Pitel et al. ...................... 363/39 |
| 2011/0012544 A1 * | 1/2011 | Schulz et al. ............ 318/400.02 |
| 2011/0050141 A1 * | 3/2011 | Yeh et al. ...................... 318/434 |

* cited by examiner

*Primary Examiner* — Walter Benson
*Assistant Examiner* — Kawing Chan
(74) *Attorney, Agent, or Firm* — Ingrassia Fisher & Lorenz P.C.

(57) ABSTRACT

A method for operation of an internal permanent magnet motor having a rotor includes determining whether a neutral point access signal is received from the rotor and operating the internal permanent magnet motor using sensorless signals corresponding to a rotor position and a rotor speed derived by a first sensorless signal estimation method when the neutral point access signal is received, wherein the first sensorless signal estimation method utilizes the neutral point access signal to generate the rotor position and the rotor speed. The method further includes operating the internal permanent magnet motor using sensorless signals corresponding to a rotor position and a rotor speed derived by a second sensorless signal estimation method when the neutral point access signal is not received, wherein the second sensorless signal estimation method does not utilize the neutral point access signal to generate the rotor position and the rotor speed.

20 Claims, 5 Drawing Sheets

FAIL-SAFE CONTROLS FOR ELECTRIC TRACTION DRIVE SYSTEMS

TECHNICAL FIELD

The present invention generally relates to electric traction drive systems, and more particularly relates to a method and apparatus for providing fail-safe controls for electric traction drive systems.

BACKGROUND OF THE INVENTION

Position sensorless electric traction drive systems have been developed for electric vehicle and hybrid vehicle applications to work more reliably and with less cost than traditional resolver-based drive systems. Such position sensorless drive systems may utilize a pulse width modulated signal modification method for low speed operation to provide fast dynamic performance. However, the pulse width modulated signal modification method requires wired access to a neutral point of the motor windings of the permanent magnet motor of the electric traction drive system. This mechanical wired connection may be lost during vehicle operation, such as through normal wear and tear. When neutral point access is lost, motor control is disturbed and the vehicle may stop or stall.

Accordingly, it is desirable to provide a method and an apparatus for providing fail-safe controls for such electric traction drive systems. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for operation of an internal permanent magnet motor having a rotor. The method includes determining whether a neutral point access signal is received from the rotor and operating the internal permanent magnet motor using sensorless signals corresponding to a rotor position and a rotor speed of the rotor derived by a first sensorless signal estimation method when the neutral point access signal is received from the rotor. The first sensorless signal estimation method utilizes the neutral point access signal to generate the rotor position and the rotor speed. The method further includes operating the internal permanent magnet motor using sensorless signals corresponding to a rotor position and a rotor speed of the rotor derived by a second sensorless signal estimation method when the neutral point access signal is not received from the rotor, wherein the second sensorless signal estimation method does not utilize the neutral point access signal to generate the rotor position and the rotor speed.

In addition, a limp home controller for controlling operation of an internal permanent magnet motor having a rotor. The limp home controller includes a first sensorless speed and position estimator, a second sensorless speed and position estimator, and a supervisory controller. The first sensorless speed and position estimator generates sensorless rotor position and rotor speed signals in accordance with a first sensorless sensorless signal estimation method, wherein the first sensorless signal estimation method utilizes a neutral point access signal received from the rotor to generate the sensorless rotor position and rotor speed signals. The second sensorless speed and position estimator generates sensorless rotor position and rotor speed signals in accordance with a second sensorless sensorless signal estimation method, wherein the second sensorless signal estimation method does not utilize the neutral point access signal to generate the sensorless rotor position and rotor speed signals. And the supervisory controller is coupled to the first sensorless speed and position estimator and the second sensorless speed and position estimator. The supervisory controller determines whether the neutral point access signal is received from the rotor and provides the sensorless rotor position and rotor speed signals from the first sensorless speed and position estimator for controlling the operation of the internal permanent magnet motor when the neutral point access signal is received from the rotor and provides the sensorless rotor position and rotor speed signals from the second sensorless speed and position estimator for controlling the operation of the internal permanent magnet motor when the neutral point access signal is not received from the rotor.

Further, an electric motor system is provided which includes an internal permanent magnet motor, an inverter, an inverter controller, and a limp home controller. The internal permanent magnet motor includes a plurality of phases and a rotor. The inverter generates a plurality of phase signals in response to modulated control signals and is coupled to the internal permanent magnet motor for providing each of the plurality of phase signals to a corresponding one of the plurality of phases of the permanent magnet motor. The inverter controller generates the modulated control signals in response to a rotor position signal, a rotor speed signal and phase current signals, the phase current signals corresponding to currents of one or more of the plurality of phase signals. And the limp home controller is coupled to the internal permanent magnet motor and the inverter controller for determining whether a neutral point access signal is received from the rotor and providing sensorless rotor position and rotor speed signals to the inverter controller as the rotor position signal and the rotor speed signal when the neutral point access signal is received from the rotor, the sensorless rotor position and rotor speed signals derived by a first sensorless signal estimation method utilizing the neutral point access signal. When the neutral point access signal is not received from the rotor, the limp home controller provides sensorless rotor position and rotor speed signals to the inverter controller as the rotor position signal and the rotor speed signal, the sensorless rotor position and rotor speed signals derived by a second sensorless signal estimation method when the neutral point access signal is not received from the rotor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
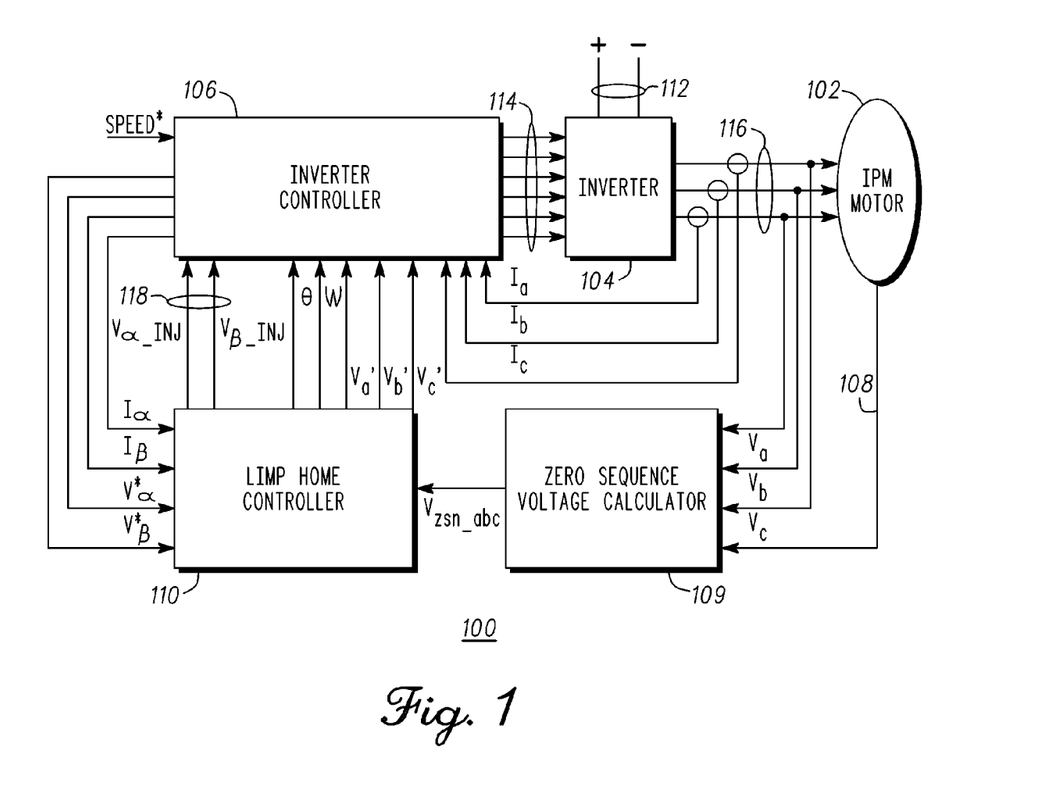
FIG. 1 illustrates a block diagram of an electric motor system in accordance with an embodiment of the present invention.

Referring to FIG. 1, a block diagram of an electric motor system 100 in accordance with an embodiment of the present invention includes a three-phase synchronous permanent magnet motor 102 operating under control of an inverter 104 and an inverter controller 106. While the present embodiment includes a three-phase synchronous internal permanent magnet motor 102, the electric motor system 100 may include permanent magnet motors of other designs which include a rotor. A neutral point of a rotor of the motor 102 is coupled to a neutral point access wire 108 for providing a neutral point access signal to zero sequence voltage calculator 109 for signaling a limp home controller 110. In accordance with the present embodiment, the limp home controller 110 generates a rotor position signal, θ, and a rotor speed signal, ω, in response to a zero sequence voltage signal, Vzsn_abc, generated by the zero sequence voltage calculator 109.

The inverter 104 is coupled to a direct current (DC) source 112 and generates a plurality of phase signals in response to modulated control signals 114 received from the controller 106 coupled thereto. The number of phase signals corresponds to the number of phases of the motor 102 which, in the present embodiment, includes three phases. The inverter 104 is coupled to the permanent magnet motor 102 and provides the plurality of phase signals on phase wires 116 for controlling the operation of the permanent magnet motor 102.

The inverter controller 106 is coupled to the inverter 104 and generates the modulated control signals 114 in response to the rotor position signal, θ, the rotor speed signal, ω, a speed command signal, Speed*, provided from a higher level controller (not shown), and phase current signals ($I_a$, $I_b$, $I_c$) sensed from the phase wires 116. In accordance with the present embodiment, the inverter controller 106 also generates the modulated control signals 114 in response to test pulsed signals $V_a'$, $V_b'$, and $V_c'$ received from the limp home controller 110. The inverter controller 106 provides the modulated control signals 114 to the inverter 104 for generation of the plurality of phase signals.

The inverter controller 104 provides two phase stationary frame alpha/beta currents, $I_\alpha$ and $I_\beta$, and two stationary frame voltage commands, $V^*_\alpha$ and $V^*_\beta$, to the limp home controller 110. The limp home controller 110 generates the rotor position signal, θ, and the rotor speed signal, ω, in response to the zero sequence voltage, $V_{zsn\_abc}$, calculated by the zero sequence voltage calculator 109 in response to the neutral point access signal provided on the neutral point access wire 108, as described above, and phase voltage signals ($V_a$, $V_b$, $V_c$) from the phase wires 116. The limp home controller 110 provides the rotor position and the rotor speed signals, θ, ω, to the inverter controller 106. The limp home controller 110 also generates two stationary frame injection voltage commands 118, $V_{\alpha\_inj}$ and $V_{\beta\_inj}$, and provides the injection voltage commands 118 to the inverter controller 106 for operation of the motor 102 at low speeds. Further, as described above, the limp home controller 110 generates the test pulsed signals $V_a'$, $V_b'$, and $V_c'$ and provides them to the inverter controller 106 for generation of the modulated control signals upon initial activation of the operational system.

Figure 2:
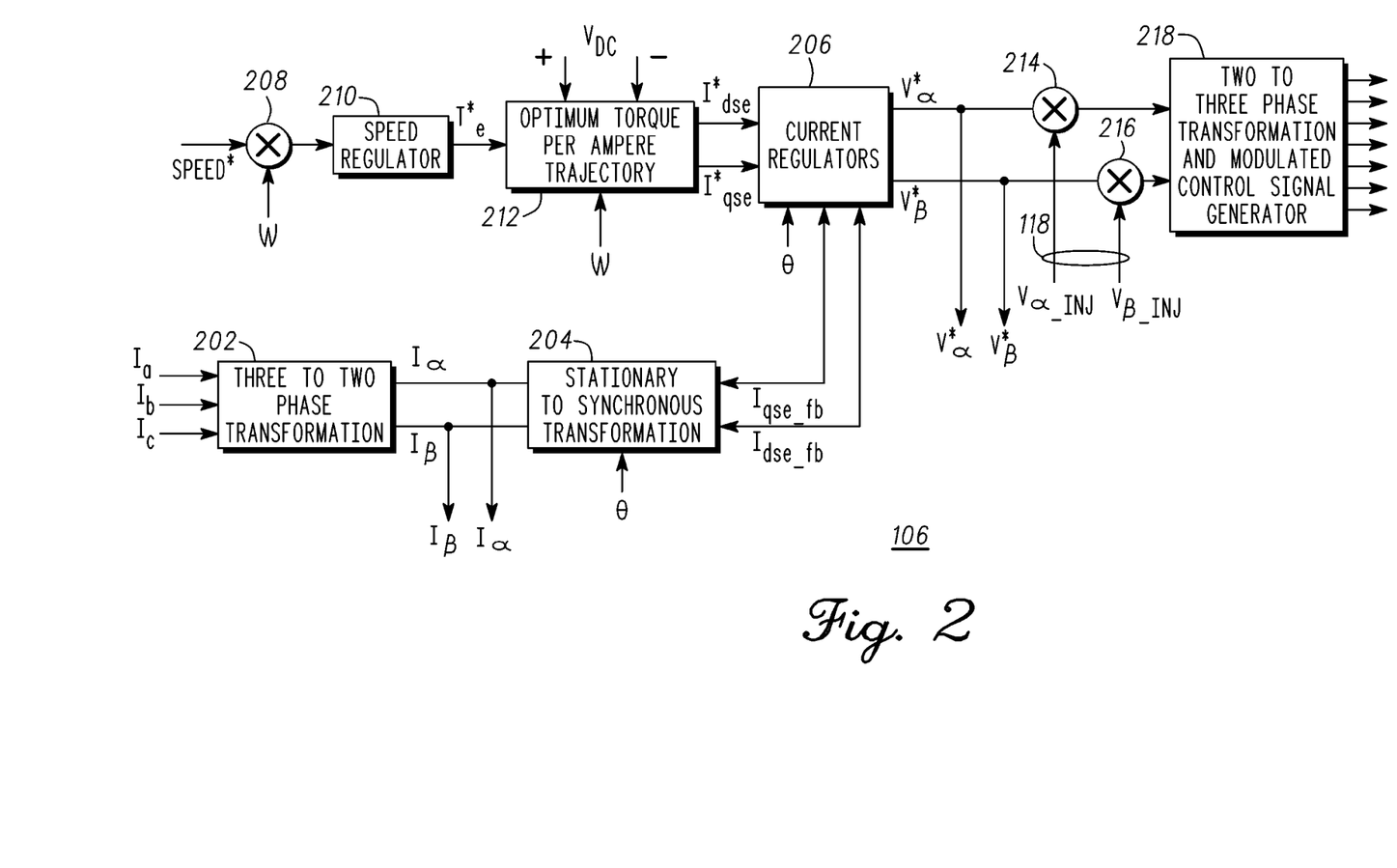
FIG. 2 illustrates a block diagram of an inverter controller of the electric motor system of FIG. 1 in accordance with the embodiment of the present invention.

Referring to FIG. 2, an exemplary block diagram of the inverter controller 106 includes a three to two transformation module 202 which converts the three sensed phase current signals ($I_a$, $I_b$, $I_c$) to equivalent two phase stationary frame alpha/beta currents, $I_\alpha$ and $I_\beta$. The two phase alpha/beta currents, $I_\alpha$ and $I_\beta$, are provided to a stationary to synchronous transformation module 204 and the limp home controller 110 (FIG. 1). The stationary to synchronous transformation module 204 transforms the two phase alpha/beta currents $I_\alpha$ and $I_\beta$ to synchronous frame feedback currents, $I_{qse\_fd}$ and $I_{dse\_fb}$, in response to the rotor position signal, θ. The synchronous frame feedback currents, $I_{gse\_fb}$ and $I_{dse\_1b}$, are provided to current regulators 206 for generating stationary frame voltage commands, $V^*_\alpha$ and $V^*_\beta$, in response to the rotor position signal, θ and two current commands in the synchronous reference frame, $I^*_{dse}$ and $I^*_{qse}$.

The speed command signal, Speed*, which, as described above, is provided from a higher level controller, is provide to a summer 208 which subtracts the rotor speed signal, ω, and provides the resultant command signal to a speed regulator module 210 which converts the command signal to a torque command signal, $T^*_e$. The torque command signal, $T^*_e$ and speed signal ω, are provided to an optimal torque per ampere trajectory determination block 212 which generates the two current commands in the synchronous reference frame, $I^*_{dse}$ and $I^*_{qse}$, for provision to the current regulators 206.

Thus it can be seen that the stationary frame voltage commands, $V^*_\alpha$ and $V^*_\beta$, are generated by the current regulators 206 by deriving voltage command signals from a combination of the synchronous frame current commands, $I^*_{dse}$ and $I^*_{qse}$, and the synchronous frame feedback currents, $I_{qse\_fb}$ and $I_{dse\_fb}$, and transforming the resultant voltage command signals to the stationary frame voltage commands, $V^*_\alpha$ and $V^*_\beta$, utilizing the rotor position signal, θ. The stationary frame voltage commands, $V^*_\alpha$ and $V^*_\beta$, are combined with injected voltage commands, $V_{\alpha\_inj}$ and $V_{\beta\_}^{inj}$, 118, at signal summers 214, 216 and the resultant signals are provided to a two to three phase transformation and modulated control signal generator 218 which generates the modulated control signals for provision to switching elements of the inverter 104 (FIG. 1).

Figure 3:
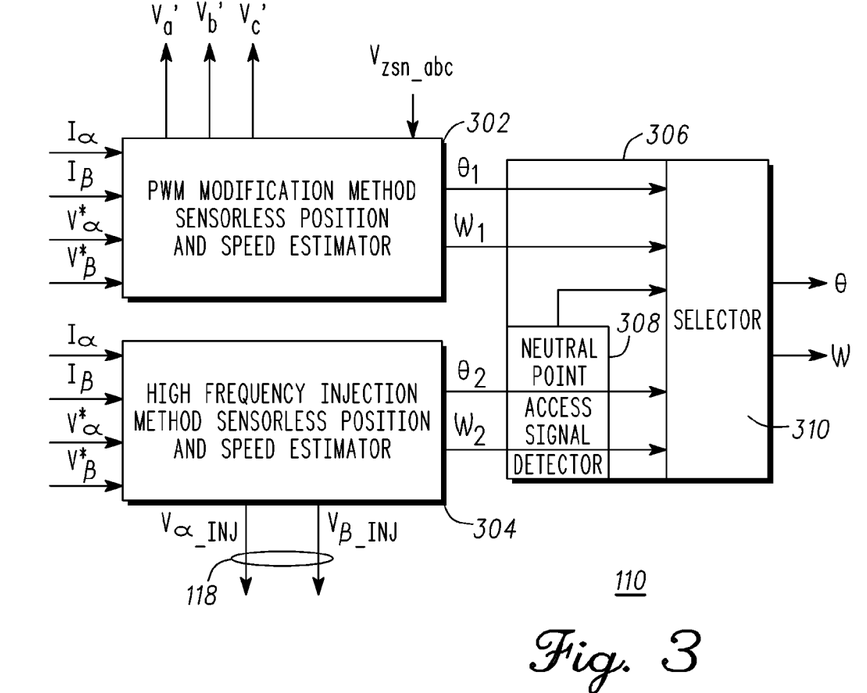
FIG. 3 illustrates a block diagram of a limp home controller of the electric motor system of FIG. 1 in accordance with the embodiment of the present invention.

Referring next to FIG. 3, an exemplary block diagram of the limp home controller 110 in accordance with the present embodiment includes a first sensorless rotor and speed estimator 302 and a second sensorless rotor and speed estimator 304. In accordance with the present embodiment, the first sensorless rotor and speed estimator 302 utilizes a pulse width modulated signal modification method for low speed operation to provide fast dynamic performance. The first sensorless rotor and speed estimator 302 receives the zero sequence voltage, $V_{zsn\_abc}$ generated by the zero sequence voltage calculator 109 (FIG. 1) in response to the neutral point access signal from wire 108 and the stationary frame voltage commands ($V^*_\alpha$ and $V^*_\beta$) from 206 and stationary frame current signals (I, I) from 202 (FIG. 2) to generate a first rotor position signal, $\theta_1$, and a first rotor speed signal, $\omega_1$. In addition, the first sensorless rotor and speed estimator 302 generates the test pulsed signals $V_a'$, $V_b'$, and $V_c'$ and provides them to the inverter controller 106 (FIG. 1) for generation of the modulated control signals upon initial activation of the operational system.

The second sensorless rotor and speed estimator 304 operates to generate a second rotor position signal, $\theta_2$, and a second rotor speed signal, $\omega_2$, by a back-up method which does not require the neutral point access signal for utilization when the neutral point access signal is not received by the limp home controller in response to damage to the wire 108. In accordance with the present embodiment, the second sensorless rotor and speed estimator 304 receives two phase stationary frame alpha/beta currents, $I_\alpha$ and $I_\beta$, and stationary frame voltage commands, $V^*_\alpha$ and $V^*_\beta$, and utilizes a high frequency injection method to generate the second rotor position signal, $\theta_2$, and the second rotor speed signal, $\omega_2$. The second sensorless rotor and speed estimator 304 also generates the two stationary frame injection voltage commands 118, $V_{\alpha\_inj}$ and $V_\beta{}^{inj}$, for injecting a high frequency signal into the motor 102 at low speeds.

A signal selector 306 receives the first rotor position and speed signals, $\theta_1$ and $\omega_1$, from the first sensorless rotor position and rotor speed estimator 302 and the second rotor position and speed signals, $\theta_2$ and $\omega_2$, from the second sensorless rotor position and rotor speed estimator 304. The first rotor position and speed signals, $\theta_1$ and $\omega_1$, are provided to a neutral point access signal detector 308 and a selector 310. Since the wire 108 is a mechanical wired connection, it may be lost, damaged or broken during vehicle operation, even through normal wear and tear. The neutral point access signal detector 308 determines whether the neutral point access signal is received from the motor 102 (i.e., whether the wire 108 is not damaged or broken). When the neutral point access signal is lost, control of the motor 102 is disturbed and, in an electric or hybrid vehicle, the vehicle may stop or stall.

When the neutral point access signal detector 308 determines that the neutral point access signal is lost, the neutral point access signal detector 308 generates a neutral point access lost signal and provides the neutral point access lost signal to the selector 310. The selector 310 receives both the first sensorless rotor position and rotor speed signals, $\theta_1$ and $\omega_1$, from the first sensorless rotor and speed estimator 302 as well as the second sensorless rotor position and rotor speed signals, $\theta_2$ and $\omega_2$, from the second sensorless rotor and speed estimator 304. In the absence of the neutral point access lost signal (the lack of the neutral point access lost signal indicating that the neutral point access signal is received by the first sensorless rotor and speed estimator 302), the selector 310 provides the first sensorless rotor position and rotor speed signals, $\theta_1$ and $\omega_1$, to the inverter controller 106 (FIG. 1) as the rotor position signal, $\theta$, and the rotor speed signal, $\omega$. On the other hand, when the selector 310 receives the neutral point access lost signal indicating that the wire 108 is broken or damaged, the selector 310 provides the second sensorless rotor position and rotor speed signals, $\theta_2$ and $\omega_2$, to the inverter controller 106 (FIG. 1) as the rotor position signal, $\theta$, and the rotor speed signal, $\omega$. In this manner, the limp home controller 110 advantageously provides a limp home operation mode when the wire 108 is broken or damaged by generating the second sensorless rotor position and rotor speed signals, $\theta_2$ and $\omega_2$, for provision to the inverter controller 106 (FIG. 1) as the rotor position signal, $\theta$, and the rotor speed signal, $\omega$, thereby enabling failsafe operation of the electric motor system 100 to prevent a vehicle stall condition.

Figure 4:
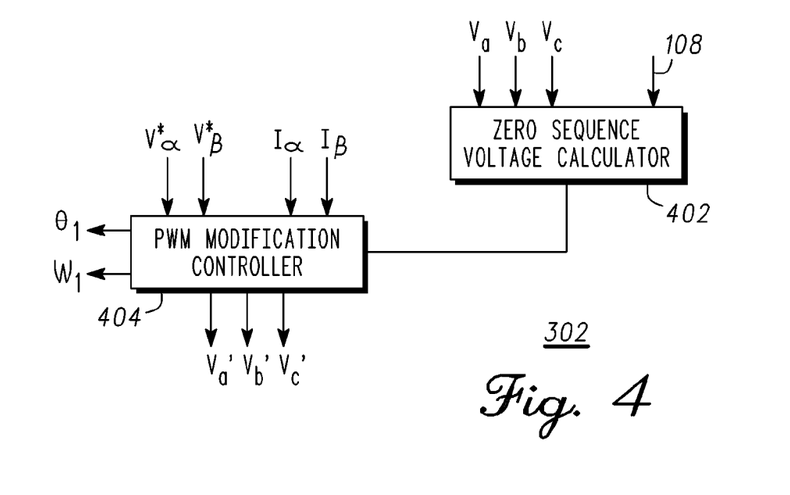
FIG. 4 illustrates a block diagram of a first back-up sensorless position and speed estimator of the limp home controller of FIG. 3 in accordance with the embodiment of the present invention.

Referring to FIG. 4, another exemplary structure of the first sensorless position and speed estimator 302 is depicted. The zero sequence calculator 109 (FIG. 1) enabled outside the limp home controller 110 may alternatively be a zero sequence voltage calculator 402 enabled inside the first sensorless position and speed estimator 302. The zero sequence voltage calculator 402 receives the neutral point access signal on wire 108. The zero sequence voltage calculator 402 also receives the phase voltage signals ($V_a$, $V_b$, $V_c$) from the phase wires 116 (FIG. 1). In response to the neutral point access signal and the phase voltage signals ($V_a$, $V_b$, $V_c$), the zero sequence voltage calculator 402 calculates a zero sequence voltage signal for low speed sensorless rotor position and rotor speed derivation.

A phase width modulation (PWM) modification controller 404 is also a portion of the first sensorless position and speed estimator 302 and receives the zero sequence voltage signal from the zero sequence voltage calculator 402, the stationary reference frame phase currents, $I_\alpha$ and $I_\beta$, and the stationary frame voltage commands, $V^*_\alpha$ and $V^*_\beta$, and, in accordance with a pulse width modulated signal modification method at least for low speed operation of the electric motor 102, derives the first sensorless rotor position and rotor speed signals, $\theta_1$ and $\omega_1$. In this manner, the first sensorless speed and position estimator 302 provides sensorless rotor position and rotor speed signals for reliable and fast dynamic performance of the electric motor system 100 so long as the wire 108 is not damaged or broken. In addition, the PWM modification controller 404 generates the test pulsed signals $V_a'$, $V_b'$, and $V_c'$ and provides them to the inverter controller 106 (FIG. 1) for generation of the modulated control signals upon initial activation of the operational system.

Figure 5:
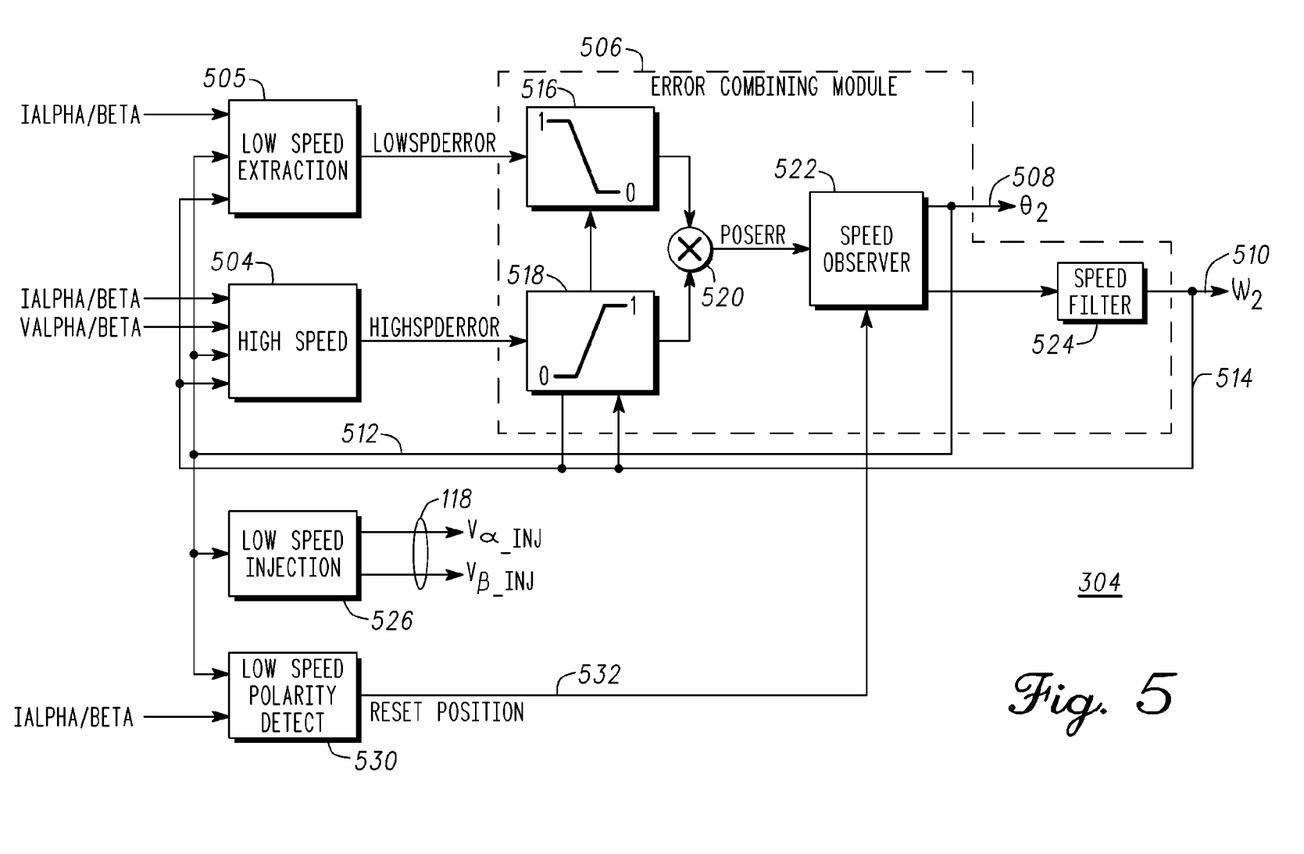
FIG. 5 illustrates a block diagram of a second back-up sensorless position and speed estimator of the limp home controller of FIG. 3 in accordance with the embodiment of the present invention.

Referring next to FIG. 5, an exemplary structure of the second sensorless position and speed estimator 304 is depicted. A low speed error extraction module 502 and a high speed error module 504 generate a low speed error signal and a high speed error signal, respectively. An error combining module 506 operates as a speed/position generator to generate the sensorless position signal 508 and the sensorless speed signal 510 for providing to the signal selector 306 (FIG. 3) in response to the low speed error signal and the high speed error signal. A sensorless position feedback signal 512 is connected to the sensorless position signal 508, thereby being equivalent thereto. Likewise, a sensorless speed feedback signal 514 is connected to the sensorless speed signal 510.

The low speed error extraction module 502 determines the low speed error signal in response to the sensorless position feedback signal 512, the sensorless speed feedback signal 514 and the two phase currents ($I_{alpha/beta}$). In a similar manner, the high speed error module 504 determines the high speed error signal in response to the sensorless position feedback signal 512, the sensorless speed feedback signal 514, the two phase currents ($I_{alpha/beta}$), and the two stationary frame voltage commands ($V_{alpha/beta}$).

The error combining module 506 includes a low speed error phase out module 516 and a high speed error phase in module 518 for providing a smooth transition from low speed sensorless operation to high speed sensorless operation. The low speed error phase out module 516 receives the low speed error signal and the sensorless speed feedback signal to calculate a low speed error component value by phasing out the low speed error signal as the speed of the vehicle increases in response to the sensorless speed feedback signal and a predetermined phase-out coefficient. Similarly, the high speed error phase in module 518 receives the high speed error signal and the sensorless speed feedback signal to calculate a high speed error component value by phasing in the high speed error signal as the speed of the vehicle increases in response to the sensorless speed feedback signal and a predetermined phase-in coefficient. The predetermined phase-out coefficient is selected so that the low speed error component value is equal to the low speed error signal at near zero speeds and smoothly phases out (e.g., straight-line phase out) to where the low speed error component value is zero when the speed reaches a predetermined low-to-high-speed transition speed. In a like manner, the predetermined phase-in signal is selected so that the high speed error component value is equal to zero at near zero speeds and smoothly phases in (e.g., a straight-line phase in) to where the high speed error component value is equal to the high speed error signal when the speed reaches or exceeds the predetermined low-to-high-speed transition speed. An error signal summer 520 combines the low speed error component value and the high speed error component value to generate a rotor error position signal. A speed observer module 522 receives the rotor position error signal and, in response thereto, calculates the sensorless position signal 508 and an observed speed signal, the observed speed signal being filtered by a speed filter 524 to generate the sensorless speed signal 510.

A low speed injection module 526 generates the injected voltage commands, $V_{\alpha\_inj}$ and $V_{\beta\_inj}$, as low speed injection signals 118 for providing to the summers 214, 216 (FIG. 2) at startup of the electric motor system 100 and at near zero low speeds to inject a high frequency signal into the flux axis of the permanent magnet motor 102 for operation of the low speed extraction module 502. The injected voltage commands, $V_{\alpha\_inj}$ and $V_{\beta\_inj}$, are generated in response to an injected voltage, $V_{inj}$, which is calculated in accordance with Equation (1).

$$V_{inj} = V_0 - V_{inj\_slope}^* (abs(\omega_r - \omega_{LH})) \quad (1)$$

wherein $V_0$ is the injected voltage at startup, $V^*_{inj\_slope}$ is the slope at which the voltage is decremented or incremented as a function of motor speed, and the difference $(\omega_r - \omega_{LH})$ is the difference between the rotor speed, $\omega_r$, and the low to high speed threshold speed, $\omega_{LH}$. The low speed injection module 526 generates a predetermined low speed injection signal $(V_{\alpha/\beta\_inj})$ for injecting a high frequency signal into a flux axis of the motor 102 at low speeds and provides the predetermined low speed injection signals as voltage signals 118 to the signal summers 214, 216 (FIG. 2) for combining with the synchronous frame voltage command signals, $V^*_\alpha$ and $V^*_\beta$. The high frequency signal is injected into the flux axis of the motor 102 at low speeds to generate the sensorless speed feedback signal 514 and the sensorless position feedback signal 512 at the low speeds.

The first time when the second sensorless position and speed estimator 304 is activated, a low speed polarity detector 530 compares the low speed error determined in response to the sensorless position feedback signal 512 to the two phase currents ($I_{alpha/beta}$). When the initial rotor position information is determined by the second sensorless rotor position and speed estimator 304, it is imperative to differentiate between the positive and negative D axis (i.e., the rotor magnet north and south poles). The low speed polarity detector 530 determines from the low speed error and the two phase currents ($I_{alpha/beta}$) whether the sensorless rotor position signal is properly aligned with the rotor north pole. If the sensorless rotor position signal is not properly aligned with the rotor north pole, a reset position signal 532 is provided to the speed observer module 522. In response to the reset position signal 532, the speed observer module 522 switches the polarity of the sensorless rotor position signal so that the position signal 508 is correctly aligned with the rotor position.

In this manner, the second sensorless position and speed estimator 304 provides the second sensorless position signal 508, $\theta_2$, and the sensorless speed signal 510, $\omega_2$, as feedback signals at both low and high speeds. Particularly, the error combining module 506, including the low speed error phase out module 516 and the high speed error phase in module 518, provides a smooth transition from low speed sensorless operation to high speed sensorless operation.

Figure 6:
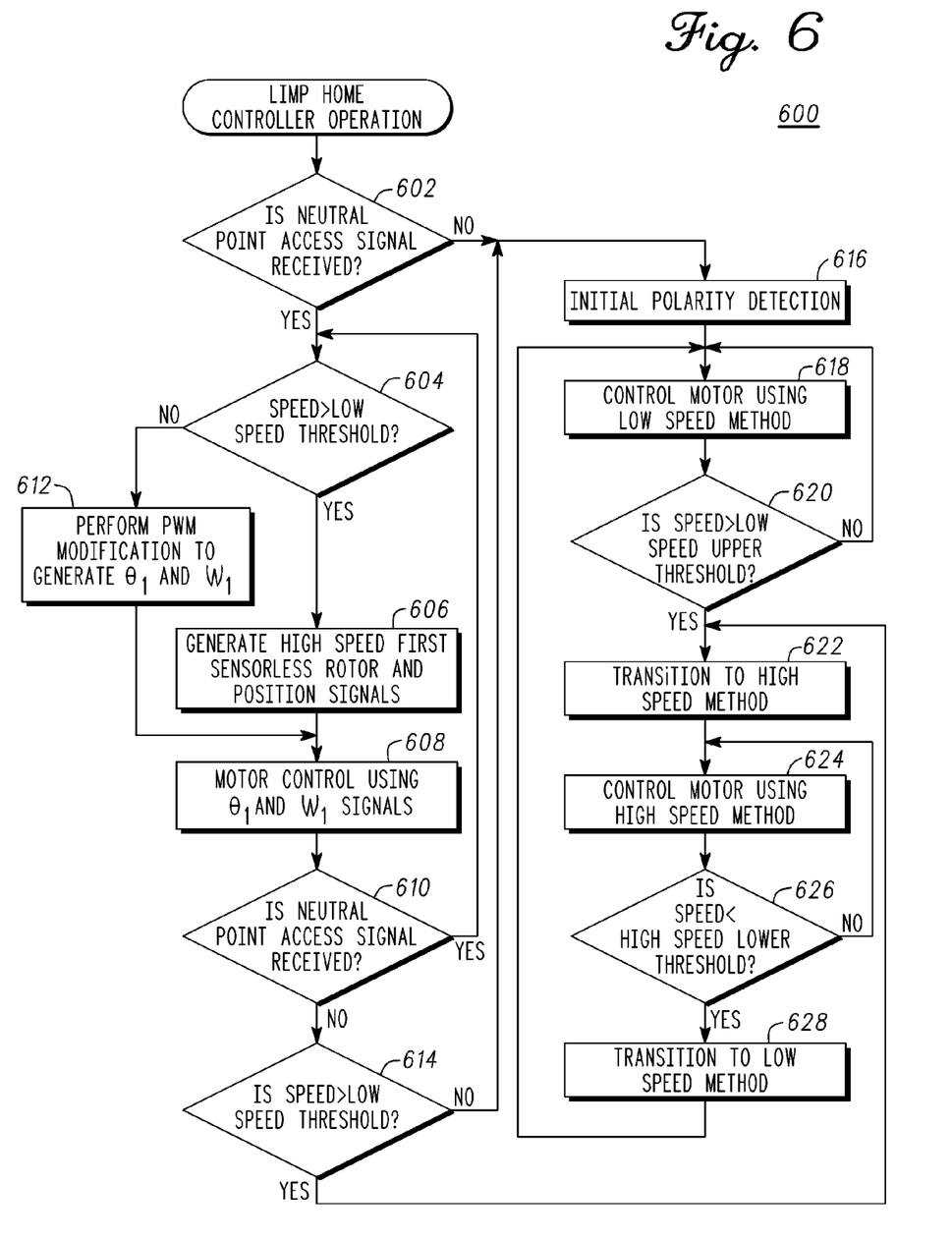
FIG. 6 illustrates a flow chart of the operation of a limp home controller of the electric motor system of FIG. 1 in accordance with the embodiment of the present invention.

While an exemplary construction of the limp home controller 110 has been depicted in FIGS. 3, 4 and 5, those skilled in the art will realize that a limp home controller 110 which provides rotor position and rotor speed signals, θ and ω, when a resolver is operating correctly and when a resolver fails can be constructed in any one of a number of different configurations. For example, the limp home controller 106, including the generation of the sensorless position signal and the sensorless speed signal can be enabled in software. Accordingly, FIG. 6 depicts a flowchart 600 of the operation of the limp home controller 110 in accordance with the present embodiment.

Initially, the limp home controller 110 determines 602 whether the neutral point access signal is received. If the neutral point access signal is received 602, the limp home controller 110 determines 604 whether the speed of the motor 102 is greater than a low speed threshold. When the speed of the motor 102 is greater than the low speed threshold 604, the limp home controller 110 generates 606 sensorless rotor position and rotor speed signals in accordance with a dynamic performance high speed sensorless method. After performing sensorless speed and position signal calculation 606, the operation of the motor 102 is controlled 608 using the sensorless rotor position and rotor speed signals. Processing then determines 610 whether the neutral point access signal is still received. If so, the limp home controller operation returns to step 604.

When the speed of the motor 102 is less than or equal to the low speed threshold 604, the limp home controller 110 generates 612 sensorless rotor position and rotor speed signals in accordance with a pulse width modulated signal modification method. After performing the pulse width modulated signal modification method to calculate the sensorless speed and position signal 612, the operation of the motor 102 is controlled 608 using the sensorless rotor position and rotor speed signals. Processing then determines 610 whether the neutral point access signal is still received. If so, the limp home controller operation returns to step 604.

When the neutral point access signal is no longer received 610, operation transitions to a sensorless high frequency signal injection method. Processing determines 614 whether the current operational state is low speed mode (i.e., whether the speed of the motor 102 is less than or equal to the low speed threshold).

If operation is in the low speed mode 614, processing performs an initial polarity detect 616 to determine if the low speed sensorless rotor position signal has the correct polarity. After correcting the polarity of the low speed sensorless rotor position signal if necessary 616, control of the motor 102 continues 618 in accordance with the low speed mode until the speed of the motor 102 becomes 620 greater than a predetermined low speed upper threshold.

When the speed of the motor 102 becomes 620 greater than the predetermined low speed upper threshold, operation transitions 622 to a high speed sensorless mode. Operation then continues 624 in accordance with the high speed sensorless mode until the speed of the motor 102 becomes 626 less than a predetermined high speed lower threshold. When the speed of the motor 102 becomes 626 less than the predetermined high speed lower threshold 626, operation returns to step 618 for controlling the motor 102 in accordance with the low speed sensorless mode.

If at step 614 it is determined that operation of the motor 102 when loss of the neutral point access signal was detected 610 was in the high speed mode, processing jumps to step 622 to transition into the high speed sensorless mode. Further, if at startup the neutral point access signal is not received 602, operation starts in the low speed sensorless operation mode by performing 616 initial polarity detect.

Thus it can be seen that the present method and apparatus for limp home operational mode of the electric motor system 100 provides a backup sensorless control method when the wire 108 breaks or is damaged sufficiently so that reception of the neutral point access signal is lost to provide a backup for motor controls, thereby providing a limp home operational mode which allows the driver to safely drive a vehicle with a failed resolver to a service station. In this manner, a fail-safe highly dynamic performance sensorless motor control method for electric traction drive systems can be provided which utilizes a neutral point access signal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operation of an internal permanent magnet motor having a rotor, the method comprising:
   determining whether a neutral point access signal is received from the rotor;
   operating the internal permanent magnet motor using sensorless signals corresponding to a rotor position and a rotor speed of the rotor derived by a first sensorless signal estimation method when the neutral point access signal is received from the rotor; and
   operating the internal permanent magnet motor using sensorless signals corresponding to a rotor position and a rotor speed of the rotor derived by a second sensorless signal estimation method when the neutral point access signal is not received from the rotor,
   wherein the first sensorless signal estimation method utilizes the neutral point access signal to generate the rotor position and the rotor speed, and
   wherein the second sensorless signal estimation method does not utilize the neutral point access signal to generate the rotor position and the rotor speed.

2. The method in accordance with claim 1 wherein operating the internal permanent magnet motor using sensorless signals corresponding to a rotor position and a rotor speed of the rotor derived by the first sensorless signal estimation method comprises operating the internal permanent magnet motor using sensorless signals corresponding to a rotor position and a rotor speed of the rotor derived by a pulse width modulated signal modification method.

3. The method in accordance with claim 2 wherein operating the internal permanent magnet motor using sensorless signals corresponding to a rotor position and a rotor speed of the rotor derived by the pulse width modulated signal modification method comprises operating the internal permanent magnet motor at speeds of the permanent magnet motor lees than a predetermined low speed threshold using sensorless signals corresponding to a rotor position and a rotor speed of the rotor derived by the pulse width modulated signal modification method in response to the neutral point access signal.

4. The method in accordance with claim 3 wherein operating the internal permanent magnet motor using sensorless signals corresponding to a rotor position and a rotor speed of the rotor derived by a second sensorless signal estimation method comprises:
   injecting a high frequency signal into a flux axis of the permanent magnet motor; and
   sensorlessly determining the rotor position and the rotor speed in response to both a flux axis error signal on a flux axis of the permanent magnet motor and a torque axis error signal on the torque axis of the permanent magnet motor, both the flux axis error signal and the torque axis error signal determined in response to current vector signals in a synchronous reference frame.

5. The method in accordance with claim 4 wherein injecting the high frequency signal into the flux axis of the permanent magnet motor comprises injecting a high frequency low speed injection signal into the flux axis of the permanent magnet motor at speeds of the permanent magnet motor less than a predetermined low speed threshold.

6. The method in accordance with claim 1 wherein operating the internal permanent magnet motor using sensorless signals corresponding to a rotor position and a rotor speed of the rotor derived by a second sensorless signal estimation method comprises operating the internal permanent magnet motor using sensorless signals corresponding to a rotor position and a rotor speed of the rotor derived by a sensorless high frequency signal injection method.

7. The method in accordance with claim 6 wherein operating the internal permanent magnet motor using sensorless signals corresponding to a rotor position and a rotor speed of the rotor derived by a sensorless high frequency signal injection method comprises:
   injecting a high frequency signal into a flux axis of the permanent magnet motor; and
   sensorlessly determining the rotor position and the rotor speed in response to both a flux axis error signal on a flux axis of the permanent magnet motor and a torque axis error signal on the torque axis of the permanent magnet motor, both the flux axis error signal and the torque axis error signal determined in response to current vector signals in a synchronous reference frame.

8. The method in accordance with claim 7 wherein injecting the high frequency signal into the flux axis of the permanent magnet motor comprises injecting a high frequency low speed injection signal into the flux axis of the permanent magnet motor at speeds of the permanent magnet motor less than a predetermined low speed threshold.

9. A limp home controller for controlling operation of an internal permanent magnet motor having a rotor, the limp home controller comprising:
   a first sensorless speed and position estimator for generating sensorless rotor position and rotor speed signals in accordance with a first sensorless signal estimation method, wherein the first sensorless signal estimation method utilizes a neutral point access signal received from the rotor to generate the sensorless rotor position and rotor speed signals; a second sensorless speed and position estimator for generating sensorless rotor position and rotor speed signals in accordance with a second sensorless signal estimation method, wherein the second sensorless signal estimation method does not utilize the neutral point access signal to generate the sensorless rotor position and rotor speed signals; and a supervisory controller coupled to the first sensorless speed and position estimator and the second sensorless speed and position estimator, the supervisory controller determining whether the neutral point access signal is received from the rotor and providing the sensorless rotor position and rotor speed signals from the first sensorless speed and position estimator for controlling the operation of the internal permanent magnet motor when the neutral point access signal is received from the rotor and providing the sensorless rotor position and rotor speed signals from the second sensorless speed and position estimator for controlling the operation of the internal permanent magnet motor when the neutral point access signal is not received from the rotor.

10. The limp home controller in accordance with claim 9 wherein the first sensorless speed and position estimator comprises a zero sequence voltage calculator coupled to the permanent magnet motor for receiving the neutral point access signal therefrom and generating a zero sequence voltage signal in response to the neutral point access signal, the first sensorless speed and position estimator generating the sensorless rotor position and rotor speed signals in response to the zero sequence voltage signal.

11. The limp home controller in accordance with claim 10 wherein the first sensorless speed and position estimator derives the sensorless rotor position and rotor speed signals by a pulse width modulated signal modification method in response to the zero sequence voltage signal.

12. The limp home operation controller in accordance with claim 9 wherein the supervisory controller comprises a neutral point access signal detector which determines whether the neutral point access signal is received from the rotor.

13. The limp home operation controller in accordance with claim 12 wherein the supervisory controller further comprises a selector coupled to the first and second sensorless speed and position estimators and the neutral point access signal detector, the selector providing the sensorless rotor position and rotor speed signals from the first sensorless speed and position estimator for controlling the operation of the internal permanent magnet motor when the neutral point access signal detector determines that the neutral point access signal is received from the rotor and for providing the sensorless rotor position and rotor speed signals from the second sensorless speed and position estimator for controlling the operation of the internal permanent magnet motor when the neutral point access signal detector determines that the neutral point access signal is not received from the rotor.

14. The limp home operation controller in accordance with claim 9 wherein the second sensorless speed and position estimator derives the sensorless rotor position and rotor speed signals by a sensorless high frequency signal injection method.

15. An electric motor system comprising:
an internal permanent magnet motor comprising a plurality of phases and including a rotor;
an inverter for generating a plurality of phase signals in response to modulated control signals and coupled to the internal permanent magnet motor for providing each of the plurality of phase signals to a corresponding one of the plurality of phases of the permanent magnet motor;
an inverter controller for generating the modulated control signals in response to a rotor position signal, a rotor speed signal and phase current signals, the phase current signals corresponding to currents of one or more of the plurality of phase signals; and
a limp home controller coupled to the internal permanent magnet motor and the inverter controller for determining whether a neutral point access signal is received from the rotor and providing sensorless rotor position and rotor speed signals to the inverter controller as the rotor position signal and the rotor speed signal, wherein the sensorless rotor position and rotor speed signals are derived by a first sensorless signal estimation method utilizing the neutral point access signal when the neutral point access signal is received from the rotor, the limp home controller further providing sensorless rotor position and rotor speed signals derived by a second sensorless signal estimation method to the inverter controller as the rotor position signal and the rotor speed signal when the neutral point access signal is not received from the rotor.

16. The electric motor system in accordance with claim 15 wherein the limp home controller comprises:
a first sensorless speed and position estimator for generating the sensorless rotor position and rotor speed signals in accordance with the first sensorless signal estimation method;
a second sensorless speed and position estimator for generating the sensorless rotor position and rotor speed signals in accordance with the second sensorless signal estimation method, wherein the second sensorless signal estimation method does not utilize the neutral point access signal to generate the sensorless rotor position and rotor speed signals; and
a supervisory controller coupled to the first sensorless speed and position estimator and the second sensorless speed and position estimator, the supervisory controller determining whether the neutral point access signal is received from the rotor and providing the sensorless rotor position and the rotor speed signals from the first sensorless speed and position estimator as a rotor position signal and a rotor speed signal to the inverter controller when the neutral point access signal is received from the rotor and providing the sensorless rotor position and rotor speed signals from the second sensorless speed and position estimator as the rotor position signal and the rotor speed signal to the inverter controller when the neutral point access signal is not received from the rotor.

17. The electric motor system in accordance with claim 16 wherein the first sensorless speed and position estimator comprises a zero sequence voltage calculator coupled to the internal permanent magnet motor for receiving the neutral point access signal therefrom and generating a zero sequence voltage signal in response to the neutral point access signal, the first sensorless speed and position estimator generating the sensorless rotor position and rotor speed signals by a pulse width modulated signal modification method in response to the zero sequence voltage signal.

18. The electric motor system in accordance with claim 16 wherein the supervisory controller comprises a neutral point access signal detector which determines whether the neutral point access signal is received from the rotor.

19. The electric motor system in accordance with claim 18 wherein the supervisory controller further comprises a selector coupled to the first and second sensorless speed and position estimators and the neutral point access signal detector, the selector providing the sensorless rotor position and rotor speed signals from the first sensorless speed and position estimator as the rotor position signal and the rotor speed signal to the inverter controller when the neutral point access signal detector determines that the neutral point access signal is received from the rotor and for providing the sensorless rotor position and rotor speed signals from the second sensorless speed and position estimator as the rotor position signal and the rotor speed signal to the inverter controller when the neutral point access signal detector determines that the neutral point access signal is not received from the rotor.

20. The electric motor system in accordance with claim 16 wherein the second sensorless speed and position estimator derives the sensorless rotor position and rotor speed signals by a sensorless high frequency signal injection method.

* * * * *